United States Patent
Malesky et al.

(10) Patent No.: US 10,040,660 B1
(45) Date of Patent: Aug. 7, 2018

(54) POWER DEVICE FOR A PRODUCT DISPENSER

(71) Applicant: GPCP IP HOLDINGS LLC, Atlanta, GA (US)

(72) Inventors: Jacob Edward Malesky, Neenah, WI (US); Russell William Diamond, Greenville, WI (US)

(73) Assignee: GPCP IP HOLDINGS LLC, Atlanta, GA (US)

( * ) Notice: Subject to any disclaimer, the term of this patent is extended or adjusted under 35 U.S.C. 154(b) by 0 days.

(21) Appl. No.: 15/651,584

(22) Filed: Jul. 17, 2017

(51) Int. Cl.
*H01L 35/00* (2006.01)
*B65H 20/00* (2006.01)
(Continued)

(52) U.S. Cl.
CPC ........... *B65H 20/005* (2013.01); *H02P 29/00* (2013.01); *H02S 40/38* (2014.12); *A47K 10/32* (2013.01)

(58) Field of Classification Search
CPC ........ B65H 26/00; B65H 16/00; B65D 83/00; H02P 1/00; H02P 3/00; H02P 6/00; H02P 23/00; H02P 25/00; H01L 35/00
USPC .................. 221/3, 9, 143, 258, 67; 356/943; 505/824; 73/170.27; 136/206; 318/3, 318/400.01, 700, 701, 430
See application file for complete search history.

(56) References Cited

U.S. PATENT DOCUMENTS 5,097,981 A * 3/1992 Degasperi ................. G07F 9/02 221/231
5,441,189 A 8/1995 Formon et al.
(Continued)

FOREIGN PATENT DOCUMENTS

CA 2 698 015 A1 10/2010
CA 2 850 835 A1 11/2015
(Continued)

OTHER PUBLICATIONS san jamar® Arriba™ Twist Solaire™ product information; http://www.sanjamar.com/product/arriba-twist-solaire/; website accessed Jul. 21, 2017
Rubbermaid® Commercial Products LumeCel™ Touch-Free Dispensing System Powered by Light product information; http://www.rubbermaidcommercial.com/rcp/lumecel/lumeeel-autofoam/index.jsp; website accessed Jul. 21, 2017.
U.S. Appl. No. 15/338,902, entitled Counter-Mounted Skincare Product Dispenser, filed Oct. 31, 2016.

*Primary Examiner* — Antony M Paul
(74) *Attorney, Agent, or Firm* — Nelson Mullins Riley & Scarborough-Georgia Pacific

(57) ABSTRACT

Systems, methods, and apparatuses regarding an improved product dispenser are provided herein. The product dispenser includes a housing and a photoelectric power device disposed on an external surface of the housing. The product dispenser may include a power storage device configured to store energy provided via the photoelectric power device. The product dispenser may also include a motor or pump configured to operate to provide a dispense of the product. The product dispenser components, including the photoelectric power device, the power storage device, and the electric motor may be aligned to operate at a system voltage such that no voltage adjustment relative to an output of the photoelectric power device is needed. This reduces electric power losses. The product dispenser may be configured to perform an installation routine to aid in proper placement of the product dispenser with respect to receiving light for powering the photoelectric power device.

20 Claims, 7 Drawing Sheets

(51) Int. Cl.
*H02P 29/00* (2016.01)
*H02S 40/38* (2014.01)
*A47K 10/32* (2006.01)

(56) References Cited

U.S. PATENT DOCUMENTS

| | | | |
|---|---|---|---|
| 5,717,478 A | 2/1998 | Kulik et al. |
| 5,772,291 A | 6/1998 | Byrd et al. |
| 5,847,794 A | 12/1998 | Kulik et al. |
| 5,938,076 A | 8/1999 | Ganzeboom |
| 6,031,302 A | 2/2000 | Levesque |
| 6,105,898 A | 8/2000 | Byrd et al. |
| 6,107,998 A | 8/2000 | Kulik et al. |
| 6,135,369 A | 10/2000 | Pendergast et al. |
| 6,184,789 B1 | 2/2001 | Richley et al. |
| 6,189,805 B1 | 2/2001 | West et al. |
| 6,209,752 B1 | 4/2001 | Mitchell et al. |
| 6,254,065 B1 | 7/2001 | Ehrensperger et al. |
| 6,263,674 B1 | 7/2001 | Fileman et al. |
| 6,293,486 B1 | 9/2001 | Byrd et al. |
| 6,695,246 B1 | 2/2004 | Elliott et al. |
| 6,826,985 B2 | 12/2004 | Broehl |
| 6,854,208 B1 | 2/2005 | Chuang et al. |
| 6,876,187 B2 | 4/2005 | Matsuyama |
| 6,988,689 B2 | 1/2006 | Thomas et al. |
| 7,168,602 B2 | 1/2007 | Broehl |
| 7,198,175 B2 | 4/2007 | Ophardt |
| 7,263,282 B2 | 8/2007 | Meyer |
| 7,270,292 B2 | 9/2007 | Rasmussen |
| 7,296,765 B2 | 11/2007 | Rodrian |
| 7,832,655 B2 | 11/2010 | Tollens et al. |
| 7,843,085 B2 | 11/2010 | Ledenev et al. |
| 7,861,964 B2 | 1/2011 | Cittadino et al. |
| 7,963,475 B2 | 6/2011 | Rodrian |
| 8,043,569 B2 | 10/2011 | Tranzeat |
| 8,101,848 B2 | 1/2012 | Kelly et al. |
| 8,162,252 B2 | 4/2012 | Cittadino et al. |
| 8,228,492 B2 | 7/2012 | Brokopp |
| 8,261,950 B2 | 9/2012 | Cittadino et al. |
| 8,353,427 B2 | 1/2013 | Landauer |
| 8,372,349 B1 | 2/2013 | Shotey et al. |
| 8,456,461 B2 | 6/2013 | Stephens |
| 8,653,428 B2 | 2/2014 | Chen et al. |
| 8,666,234 B1 | 3/2014 | Michael et al. |
| 8,746,510 B2 | 6/2014 | Cittadino et al. |
| 8,816,536 B2 | 8/2014 | Borke et al. |
| 8,882,998 B2 | 11/2014 | Tranzeat et al. |
| 8,950,628 B2 | 2/2015 | Muderlak et al. |
| 9,061,325 B2 | 6/2015 | West et al. |
| 9,237,815 B2 | 1/2016 | Smith |
| 9,241,600 B2 | 1/2016 | Pelfrey |
| 9,271,612 B2 | 3/2016 | Miller |
| 9,604,811 B2 | 3/2017 | Case et al. |
| 9,830,764 B1 * | 11/2017 | Murphy ............... G07F 11/002 |
| 2007/0193968 A1 | 8/2007 | Smith et al. |
| 2008/0121650 A1 | 5/2008 | Smith |
| 2009/0014057 A1 | 1/2009 | Croft et al. |
| 2009/0026305 A1 * | 1/2009 | Elliott ................ A47K 10/36 |
| | | 242/563.2 |
| 2009/0134139 A1 | 5/2009 | Quartararo |
| 2009/0261777 A1 | 10/2009 | Chen et al. |
| 2010/0084006 A1 | 4/2010 | Shyu et al. |
| 2010/0252569 A1 | 10/2010 | Pelfrey |
| 2011/0036855 A1 | 2/2011 | Petocchi et al. |
| 2011/0267324 A1 | 11/2011 | Stephens |
| 2013/0043272 A1 | 2/2013 | Oakes |
| 2014/0117036 A1 | 5/2014 | Smith |
| 2014/0172523 A1 | 6/2014 | Stob et al. |
| 2015/0008865 A1 | 1/2015 | Wang et al. |
| 2015/0041484 A1 | 2/2015 | Oakes |
| 2015/0289679 A1 | 10/2015 | Oakes |
| 2015/0313422 A1 | 11/2015 | Ophardt et al. |
| 2016/0030620 A1 | 2/2016 | Peterson et al. |

FOREIGN PATENT DOCUMENTS

| | | |
|---|---|---|
| EP | 2 236 066 A2 | 10/2010 |
| KR | 10-2012-0097656 A | 9/2012 |
| WO | WO 2004/052505 A1 | 6/2004 |
| WO | WO 2013/191797 A1 | 12/2013 |
| WO | WO 2015/002607 A1 | 1/2015 |
| WO | WO 2015/028816 A1 | 3/2015 |

* cited by examiner

POWER DEVICE FOR A PRODUCT DISPENSER

FIELD

Embodiments of the present invention relate to power devices for product dispensers and, more particularly, to photoelectric (e.g., solar, light, photovoltaic, etc.) power devices for product dispensers.

BACKGROUND

Product dispensers are used to provide on-demand product (e.g., sheet product, soap, cutlery, air freshener, etc.) to users. For example, in response to a user request or after a certain amount of time, a motor/pump of the dispenser may cause a dispense of the product to occur. Conventional product dispensers include a battery to power the electric motor and/or other components. Batteries provide the flexibility to allow a dispenser to be placed in any location, without concern as to where, for example, a power outlet is located. However, batteries have the drawback of needing to be replaced regularly to maintain operation of the dispenser and reliability for users.

SUMMARY OF THE INVENTION

In light of the foregoing background, example embodiments include an example product dispenser that is powered, at least in part, by a photoelectric power source and optimized for operation with the photoelectric power source. In this regard, according to some example embodiments, a product dispenser may have an internal system operating voltage that matches the output voltage of the photoelectric power source. Associated methods are also provided. Further, according to some example embodiments, a product dispenser may be configured to assist an installer of the dispenser by detecting a quantity of light at a current location of the dispenser and provide the installer with audible or visual feedback indicating that the amount of light received at the current position can support the power needs and operation of the dispenser.

An example embodiment of the present invention provides a product dispenser. The product dispenser comprises a housing and a photoelectric power device disposed on an external surface of the housing. The photoelectric power device is configured to receive light and convert the received light to output a system voltage. The product dispenser further includes a power storage device configured to store energy provided via an electrical connection with the photoelectric power device. The power storage device is configured to operate at the system voltage such that no voltage adjustment relative to an output of the photoelectric power device is needed. The product dispenser further includes a dispensing mechanism comprising an electric motor that operates to cause dispensing of sheet product from the product dispenser. The electric motor is powered by the power storage device and configured to operate at the system voltage such that no voltage adjustment relative to the output of the photoelectric power device is needed. Operating voltage alignment of the photoelectric power device, the power storage device, and the electric motor at the system voltage reduces electric power losses.

In some embodiments, the photoelectric power device comprises at least one photovoltaic cell. In some embodiments, the photoelectric power device comprises a flexible surface that contours to an external surface of the housing. In some embodiments, the photoelectric power device comprises solar paint. In some embodiments, the photoelectric power device has a peak power transfer efficiency at the system voltage. In some embodiments, the power storage device comprises a lithium cell battery. In some embodiments, the power storage device directly powers the electric motor.

In another example embodiment of the present invention, an apparatus is provided. The apparatus includes a housing and a photoelectric power device disposed on an external surface of the housing. The photoelectric power device is configured to receive light and convert the received light to output a system voltage. The apparatus includes a power storage device configured to store energy provided via an electrical connection with the photoelectric power device. The power storage device is configured to operate at the system voltage such that no voltage adjustment relative to an output of the photoelectric power device is needed. The apparatus further includes an electric motor powered by the power storage device and configured to operate at the system voltage such that no voltage adjustment relative to the output of the photoelectric power device is needed. Operating voltage alignment of the photoelectric power device, the power storage device, and the electric motor at the system voltage reduces electric power losses.

In some embodiments, the photoelectric power device comprises at least one photovoltaic cell. In some embodiments, the photoelectric power device comprises a flexible surface that contours to an external surface of the housing. In some embodiments, the photoelectric power device comprises solar paint. In some embodiments, the photoelectric power device has a peak power transfer efficiency at the system voltage. In some embodiments, the power storage device comprises a lithium cell battery.

In yet another example embodiment of the present invention, a product dispenser is provided. The product dispenser includes a housing and a photoelectric power device disposed on an external surface of the housing. The photoelectric power device is configured to receive light and provide an output power signal indicative of an amount of light being received by the photoelectric device. The product dispenser includes a user interface and a controller. The controller is configured to receive an input signal, wherein the input signal is based on the output power signal of the photoelectric power device. The controller is further configured to compare a characteristic value of the input signal to a light quantity threshold. The controller is further configured to operate, in an instance in which the characteristic value of the input signal satisfies the light quantity threshold, the user interface to indicate that sufficient light is being received by the photoelectric power device to support operation of the product dispenser.

In some embodiments, the user interface emits visual or audible user feedback. In some embodiments, the controller is configured to compare the characteristic value of the input signal in response to transitioning into an installation locate mode. In some embodiments, the controller is configured to repeatedly compare the characteristic value of the input signal to the light quantity threshold. In some embodiments, the characteristic value of the input signal is indicative of an open circuit voltage of the photoelectric power device. In some embodiments, the characteristic value of the input signal is indicative of a short circuit current of the photoelectric power device. In some embodiments, the characteristic value of the input signal is indicative of a voltage measured across terminals of a power storage device. In some embodiments, the characteristic value of the input signal is indicative of a current through terminals of the power storage device.

In yet another example embodiment of the present invention, a method is provided. The method comprises receiving, at a controller, an electrical input signal, wherein the electrical input signal is based on an output power signal of the photoelectric power device. The method further comprises comparing a characteristic value of the electrical input signal to a light quantity threshold. The method further comprises operating, by the controller, in an instance in which the characteristic value of the input signal satisfies the light quantity threshold, the user interface to indicate that sufficient light is being received by the photoelectric power device to support operation of the product dispenser.

In some embodiments, operating the user interface includes operating the user interface to emit visual and/or audible user feedback, such as directly from the product dispenser and/or from a remote device. In some embodiments, comparing the characteristic value of the input signal is performed in response to transitioning into an installation locate mode. In some embodiments, the method includes repeatedly comparing, by the controller, the characteristic value of the input signal to the light quantity threshold. In some embodiments, the characteristic value of the input signal is indicative of an open circuit voltage of the photoelectric power device. In some embodiments, the characteristic value of the input signal is indicative of a short circuit current of the photoelectric power device. In some embodiments, the characteristic value of the input signal is indicative of a voltage measured across terminals of a power storage device. In some embodiments, the characteristic value of the input signal is indicative of a current through terminals of the power storage device.

BRIEF DESCRIPTION OF THE SEVERAL VIEWS OF THE DRAWINGS

Figure 1:
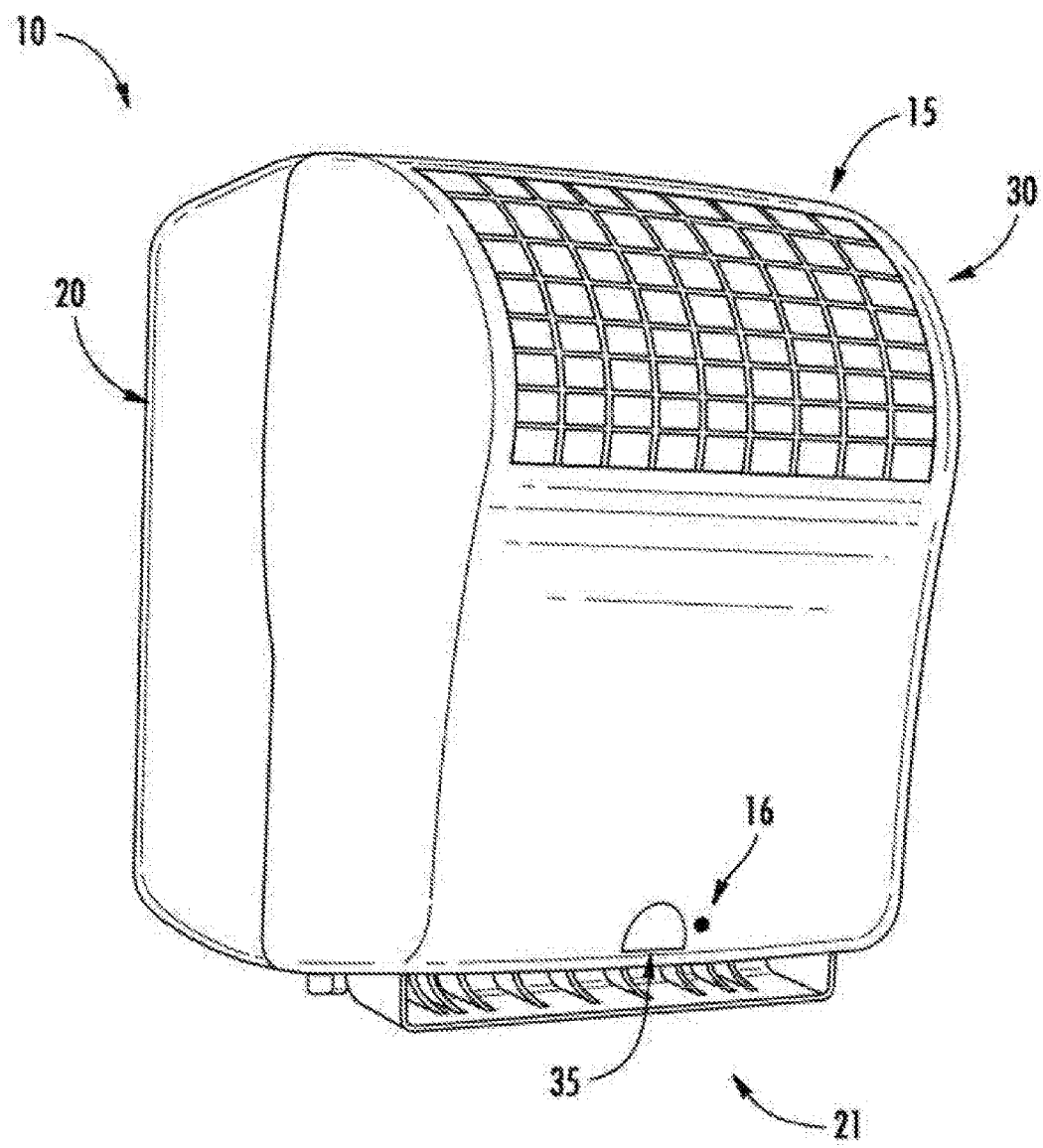
Figure 2:
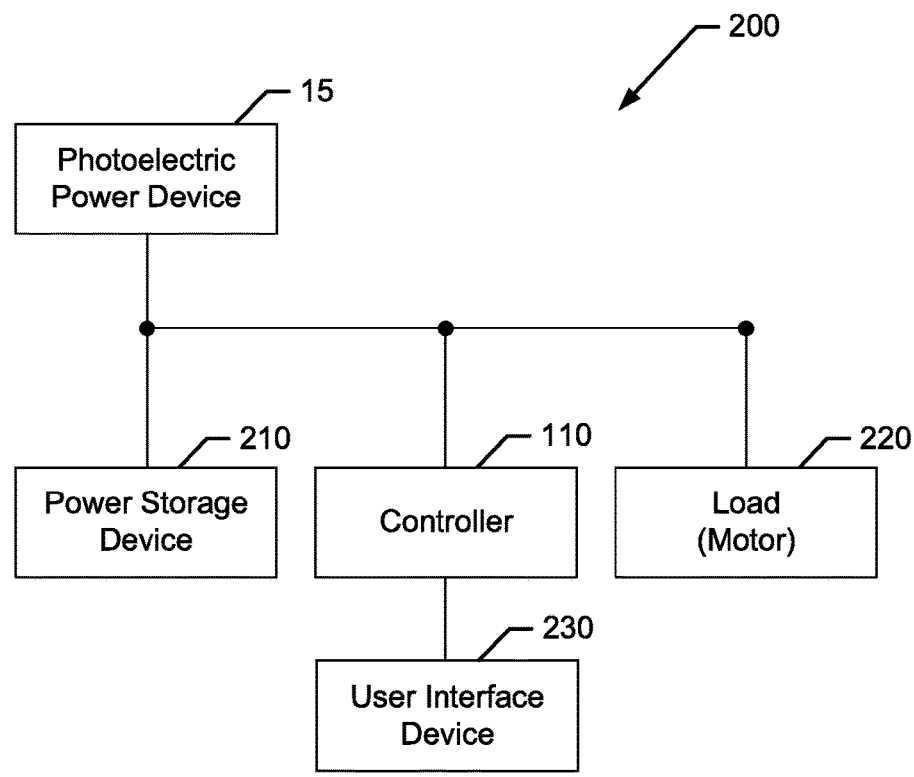
Figure 4:
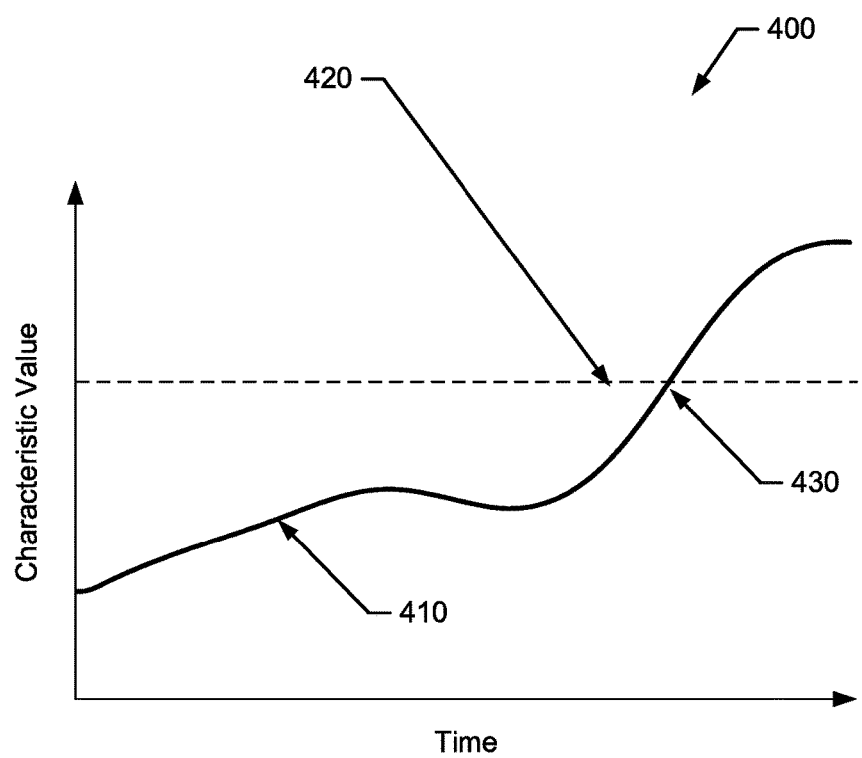
Figure 5:
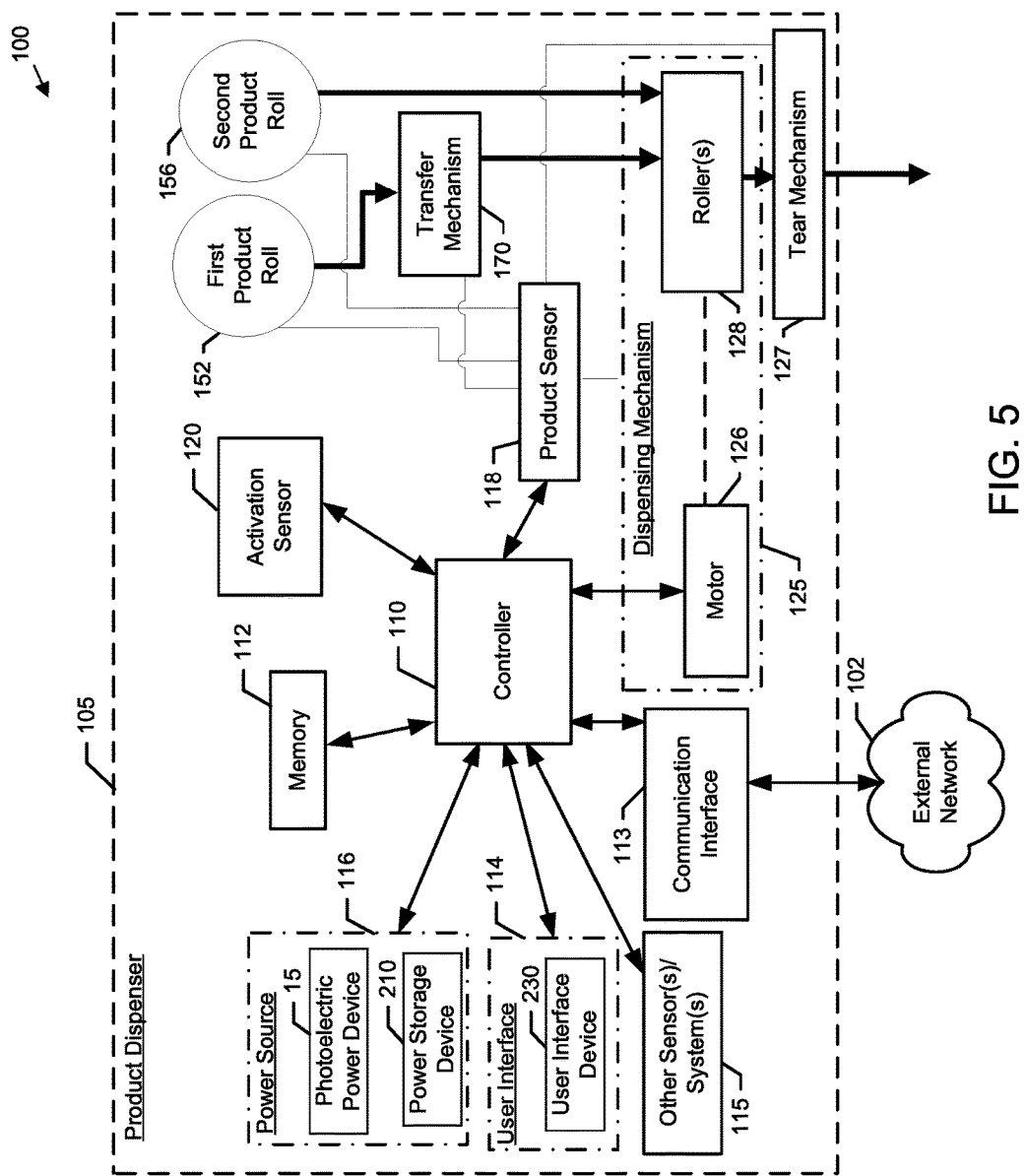
Figure 6:
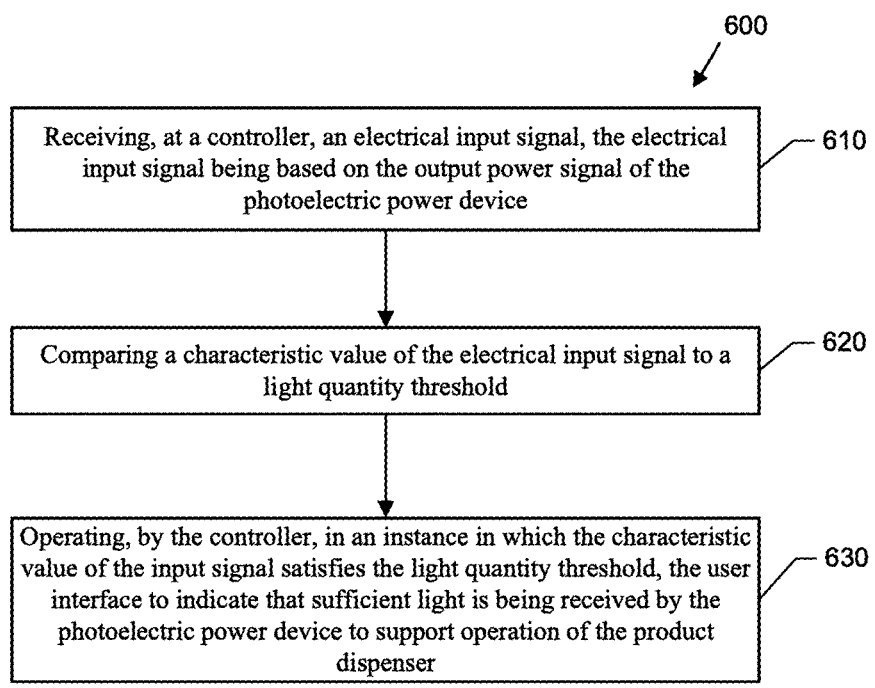

Having thus described the example embodiments in general terms, reference will now be made to the accompanying drawings, which are not necessarily drawn to scale, and wherein:

FIG. 1 shows a perspective view of an example sheet product dispenser, in accordance with some embodiments discussed herein;

FIG. 2 shows a block diagram of some components of an example sheet product dispenser, in accordance with some embodiments discussed herein;

FIGS. 3A-3D show schematic block diagrams of some components of an example sheet product dispenser that are utilized to determine a characteristic value of an input signal from a photoelectric power device, in accordance with some embodiments discussed herein;

FIG. 4 shows an example chart illustrating various characteristic values of an input signal from a photoelectric power device taken over time, in accordance with some embodiments discussed herein;

FIG. 5 is shows a block diagram illustrating an example system for controlling and operating an example sheet product dispenser, in accordance with some embodiments discussed herein; and FIG. 6 shows a flowchart of an example method for providing dispenser installation positioning feedback, in accordance with some embodiments discussed herein.

DETAILED DESCRIPTION

Embodiments of the present invention now will be described more fully hereinafter with reference to the accompanying drawings, in which some, but not all embodiments of the invention are shown. Indeed, these embodiments may take many different forms and should not be construed as limited to the embodiments set forth herein; rather, these embodiments are provided so that this disclosure will satisfy applicable legal requirements. Like numbers refer to like elements throughout.

Though various example embodiments described herein relate to sheet product dispensers, some embodiments of the present invention contemplate use of various described embodiments with any type of dispensers, product dispensers, or the like. For example, some embodiments of the present invention can be utilized with respect to sheet product dispensers (e.g., paper towel dispensers, napkin dispensers, tissue dispensers, etc.), cutlery dispensers, soap dispensers, or air freshener dispensers.

FIG. 1 illustrates an example sheet product dispenser 10 according to some embodiments, such as in accordance with the sheet product dispenser 200 (shown in FIG. 2) and 105 (shown in FIG. 5) and its corresponding components. The sheet product dispenser 10 includes a housing defined by a base portion 20 and a cover 30. The sheet product dispenser 10 also includes a dispensing slot 21 where the sheet product (e.g., paper towel) is provided to the user. Such sheet product may, such as described herein, be dispensed in response to user input being provided to an activation sensor 35.

According to some example embodiments, the sheet product dispenser 10 may also include a photoelectric power device 15 that is capable of receiving light and converting the light into electrical power to support the operation of one or more electrical loads of the sheet product dispenser 10 (e.g., an electric motor, user interface, sensors, etc.). For example, such as described in greater detail herein, the electrical power from the photoelectric power device 15 may provide power to support operation of one or more motors for operating a dispensing mechanism of the product dispenser. Additionally or alternatively, the electrical power from the photoelectric power device 15 may provide power to support operation of other components of the product dispenser (e.g., one or more user interfaces, one or more sensors, etc.). In some embodiments, a photoelectric power device according some example embodiments described herein may be used to provide power to support operation of one or more sensors and/or other components (e.g., controllers, communication devices, etc.) to enable monitoring and reporting usage data of the product dispenser. In such example embodiments, the photoelectric power device may be the sole power source for enabling monitoring and usage data, such as may be useful for enabling monitoring and usage data collection from a manual product dispenser.

In some embodiments, the photoelectric power device 15 may be disposed on an external surface of the dispenser housing. In this regard, the photoelectric power device 15 may be disposed in a position on the upper portion of the base 20 or cover 30 to receive light from light sources, such as indoor lighting sources or the sun (e.g., through windows, sky lights, or the like). Further, the sheet product dispenser 10 may also include a user interface that may be controlled by a controller of the sheet product dispenser 10 to provide information to a user or maintainer of the sheet product dispenser 10.

In some embodiments, the user interface may provide, for example, visual or audible feedback to the user regarding placement of the sheet product dispenser 10 during installation based on an amount of light being received by the photoelectric power device 15. For example, the sheet product dispenser 10 may include a feedback light 16 for providing feedback. Additionally or alternatively, the sheet product dispenser may include other user interfaces, such as one or more displays or speakers. The above examples detail some possible feedback uses for the user interface. In some embodiments, other feedback or other uses for the user interface are also contemplated, such as utilizing the user interface during normal operation of the product dispenser (e.g., indicating an amount of product remaining, indication that a dispense is occurring, etc.).

In some embodiments, in addition to or alternative to providing feedback directly from the sheet product dispenser 10, feedback may be provided through one or more remote devices, such as a remotely located bathroom monitoring station or a maintenance person's smartphone.

As used herein, the term "sheet product" may include a product that is relatively thin in comparison to its length and width. Further, the sheet product may define a relatively flat, planar configuration. In some embodiments, the sheet product is flexible or bendable to permit, for example, folding, rolling, stacking, or the like. In this regard, sheet product may, in some cases, be formed into stacks or rolls for use with various embodiments described herein. Some example sheet products include towel, bath tissue, facial tissue, napkin, wipe, wrapping paper, aluminum foil, wax paper, plastic wrap, or other sheet-like products. Sheet products may be made from paper, cloth, non-woven, metallic, polymer or other materials, and in some cases may include multiple layers or plies. In some embodiments, the sheet product (such as in roll or stacked form) may be a continuous sheet that is severable or separable into individual sheets using, for example, a tear bar or cutting blade. Additionally or alternatively, the sheet product may include predefined areas of weakness, such as lines of perforations, that define individual sheets and facilitate separation and/or tearing. In some such embodiments, the lines of perforations may extend along the width of the sheet product to define individual sheets that can be torn off by a user.

FIG. 2 provides a block diagram of select components of an example apparatus 200 (e.g., a sheet product dispenser, such as in accordance with the sheet product dispenser 10 or the sheet product dispenser 105 and its corresponding components described with respect to FIG. 5). In this regard, the sheet product dispenser 200 may include a photoelectric power device 15, a power storage device 210, a controller 110, a load 220, and a user interface 230.

The photoelectric power device 15 may be any type of device or material that can receive and convert light into electrical energy. In this regard, the photoelectric power device 15 may include a solar cell or other photovoltaic cell, solar paint, or the like. Further, the photoelectric power device 15 may include a light receiving surface that may be external to the housing (or disposed behind transparent plastic). The light receiving surface of the photoelectric power device 15 may be formed in a flat plane, or the surface may be contoured to match a shape of the sheet product dispenser 200 housing (e.g., as seen in FIG. 1). In some embodiments, the photoelectric power device 15 may be flexible to conform to the contours of the housing. For example, the photoelectric power device may be a flexible solar panel. Since the photoelectric power device 15 may conform to the contours of the housing, the photoelectric power device 15 may cover relatively more surface area of the housing that is directed toward incoming light, and therefore receive an increased amount of light. Along these lines, the ability to curve the surface of the photoelectric power device 15 may enable direction of the surface generally toward a light source that may be positioned in the middle of the wash room. Further, providing a curved surface may enable the dispenser to maintain a small footprint and, in some cases, be aesthetically pleasing.

According to some example embodiments, the photoelectric power device 15 may be selected or configured to provide an output power signal. Characteristics of the output power signal (e.g., the voltage of the signal) may be indicative of an amount of light that is being received by the photoelectric power device 15. According to some example embodiments, the photoelectric power device 15 may output the signal at a particular, selected voltage when, for example, operating at a maximum efficiency. In this regard, the photoelectric power device 15 may be selected or otherwise optimized to have maximum efficiency when outputting the selected voltage. Further, the maximum power point and the peak power transfer efficiency for the photoelectric power device 15 may be at the selected voltage. According to some example embodiments, the selected voltage may be a voltage between 1.5 to 5 volts and, in some example embodiments, between 3 to 3.6 volts. For example, the selected voltage may be about 3.6 volts.

According to some example embodiments, the selected voltage may be used as, and therefore referred to as, the system voltage for the sheet product dispenser 200. In this regard, a number of components of the sheet product dispenser 200 may be selected or configured to operate at the system voltage. More specifically, the components of the sheet product dispenser 200 may be selected or configured to operate at high efficiency when operating at the system voltage. As indicated above, according to some example embodiments, the system voltage may be, for example, 3.6 volts.

The power storage device 210 may be any type of storage device capable of receiving electrical energy, storing the electrical energy, and outputting the electrical energy, in an electrical form, when needed to operate the sheet product dispenser 200. In this regard, according to some example embodiments, the power storage device 210 may be a rechargeable battery, a super capacitor, or the like. According to some example embodiments, the power storage device 210 may be one of an assembly (series or parallel) of batteries (such as lithium cell batteries including, for example, one or more lithium iron phosphate cells).

The power storage device 210 may be configured to receive a voltage for charging purposes via an electrical connection to the photoelectric power device 15 and output the same voltage to power various electric components of the sheet product dispenser 200. According to some example embodiments, the power storage device 210 may operate (receive and output) at the system voltage. In this regard, the photoelectric power device 15 and the power storage device 210 may be selected or configured to operate at or near the system voltage with high efficiency to reduce losses by avoiding the need for voltage regulation components. Operating at the system voltage may also avoid losses associated with operating the photoelectric power device 15 at voltages that are not at or near the photoelectric power device 15 maximum efficiency point.

The controller 110, which is further described below with respect to FIG. 5, may be any type of processing device that is capable of directing the operation of the sheet product dispenser 200. In this regard, the controller 110 may be configured to control the charging of the power storage device 210, operate the user interface 230, and the like. According to some example embodiments, the controller 110 may be configured to operate at the system voltage.

The user interface 230 may include any type of user feedback device, such as, a light emitting device, a sound emitting device, or the like. According to some example embodiments, the user interface 230 may include a light emitting diode (LED) that is illuminated based on a control signal from the controller 110. Similarly, the user interface 230 may be a speaker or piezoelectric sounder that is controlled by controller 110 to emit a sound. According to some example embodiments, the user interface 230 may include a display screen or any device or mechanism configured to provide feedback to a user.

The load 220 may be representative of the electric load of the sheet product dispenser 200 that is powered by the photoelectric power device 15 and the power storage device 210. The load 220 may include a number of electrically powered devices/components, some or all of which may operate at the system voltage. For example, the load 220 may include a dispensing mechanism configured to automatically dispense a sheet product for removal by a user. In this regard, the dispensing mechanism may include an electric motor that may, for example, be mechanically configured to drive one or more rollers to dispense a portion of a roll of sheet product as part of a sheet product dispensing operation. In this regard, the electric motor may rotate to advance a sheet product into a removal position. According to some example embodiments, the motor may be directly powered (i.e., with no intermediate components) by the power storage device 210 at the system voltage (i.e., without the aid of voltage regulation circuitry). Further, the motor may be optimized for speed and efficiency at the system voltage (e.g., 3.6 volts) or a range that includes the system voltage (e.g., 3.0 to 3.6 volts).

As indicated above, the photoelectric power device 15, power storage device 210, and load 220 may be electrically connected and configured to operate at the system voltage. The photoelectric power device 15 and the power storage device 210 may be electrically coupled in a manner such that the two components operate as a unit to support the electrical power demands of the sheet product dispenser 200. In this regard, some or all of the electric components may be matched for common voltage operation to avoid the need for additional voltage regulation circuity that can reduce the overall power efficiency of the sheet product dispenser 200. Further, the power storage device 210 may be configured to operate at the system voltage such that no voltage adjustment relative to an output of the photoelectric power device is needed, and the load or a portion thereof (e.g., electric motor) may be configured to operate at the system voltage such that no voltage adjustment relative to the output of the photoelectric power device is needed to support its operation. In this manner, electric components of the sheet product dispenser 200 (e.g., the photoelectric power device 15, power storage device 210, and the electric motor) may operate at an aligned system voltage to, for example, reduce electric power losses and reduce or eliminate components that may be needed for voltage adjustment due to varying input voltage needs.

According to some example embodiments, the sheet product dispenser 200 may include the ability to assist an installer with placement of the sheet product dispenser 200 at a location that receives sufficient light to support proper operation of the sheet product dispenser 200. According to some example embodiments, the controller 110 may be configured to measure a signal indicative of the amount of light that the photoelectric power device 15 is receiving and alert the installer if the measured signal indicates that sufficient light is being received. While some of the following example embodiments describe a contemplated method of installation with respect to a sheet product dispenser, some embodiments of the present invention contemplate use of such a method with other types of dispensers or bathroom fixtures that utilize solar or photoelectric power (e.g., air fresheners, lighting, etc.).

The controller 110 may be configured to receive an input signal that is based on the output power signal of the photoelectric power device 15. The controller 110 may be further configured to compare a characteristic value of the input signal (e.g., the voltage, the current, or the like) to a light quantity threshold. If the characteristic value of the input signal, for example, meets or exceeds the light quantity threshold, then it may be determined that the current location of the sheet product dispenser 200 allows the photoelectric power device 15 to receive sufficient light to power the electric components of the sheet product dispenser 200 and support proper operation. In some embodiments, to indicate that the characteristic value has met or exceeded the light quantity threshold, the controller 110 may be configured to operate the user interface 230 to emit visual or audible user feedback, such as described herein. Additionally or alternatively, the controller 110 may be configured to cause one or more signals to be sent to one or more remote devices, such as to cause user feedback to be emitted (e.g., visually or audibly) from such remote devices (e.g., a text message may be presented on a remotely located smartphone).

According to some example embodiments, the user interface 230 may change behavior (e.g., blink more rapidly or a frequency of a sound may chance) based on a current value of the characteristic value, changes to the current value of the characteristic value, or a delta between the characteristic value and the light quantity threshold. In this regard, for example, as a positive delta between the characteristic value and the light quantity threshold increases, the behavior of the user interface 230 may be modified by the controller 110 to indicate that additional light beyond the light quantity threshold is being received at the current location. As the positive delta increases, for example, the blink frequency or brightness of a light may increase, an audible frequency of a sound emitted by a speaker may increase, or a gauge or metric rendered on a display may increase. The gauge or metric in the form of a numerical value may be provided on the display that may be based on the characteristic value. According to some example embodiments, a percentage relative to the light quantity threshold may be provided on the display as an indication for the installer. Accordingly, the controller 110 may be configured to control the user interface to have a first behavior profile (e.g., light is not illuminated) when the characteristic value is below the light quantity threshold, a second behavior profile when the characteristic value is at the light quantity threshold (e.g., light is illuminated), and a third behavior profile when the characteristic value is above the light quantity threshold (e.g., light blinks based on characteristic value to light quantity threshold positive delta). In some embodiments, other notification methods are contemplated. For example, a light or audible noise may be used in the form of a Geiger counter to indicate the proper location of installation.

In some embodiments, the controller 110 and/or the sheet product dispenser 200 may enter an installation locate mode. For example, an installer of the sheet product dispenser 200 may operate the sheet product dispenser 200 (e.g., by depressing a button connected to the controller or the like) to place the controller 110 and/or the sheet product dispenser 200 into the installation locate mode. In some embodiments, the controller 110 and/or the sheet product dispenser 200 may be placed into the installation locate mode remotely (e.g., using a smartphone, using a remote workstation, etc.). While in this mode, the installer may move the sheet product dispenser 200 into different locations within, for example, a restroom, to determine a location where the photoelectric power device 15 receives sufficient light to support the electric power requirements of the components of the sheet product dispenser 200. When the installer moves the sheet product dispenser 200 into a location with sufficient light (e.g., into a location where the characteristic value exceeds the light quantity threshold) then, for example, a light of the user interface 230 may be activated by the controller 110 to indicate to the installer that the current location is acceptable to support the power demands of the sheet product dispenser 200 for proper operation.

The characteristic value may be obtained in a number of ways via a variety of component architectures. The controller 110 may be configured to monitor a signal at an analysis node of the architecture to determine the characteristic value of the signal. In this regard, one or more of several alternative circuit architectures may be used to generate the input signal such that the characteristic value is, for example, a current into a capacitor, a voltage at a capacitor, a change in charge, an open circuit voltage, a short circuit current, or the like, all of which may be indicative of the amount of light that is being received by the photoelectric power device 15. The following provides example circuit architectures that can be used to generate such an input signal for analysis by the controller 110 to make a comparison with the light quantity threshold.

Figure 3A:
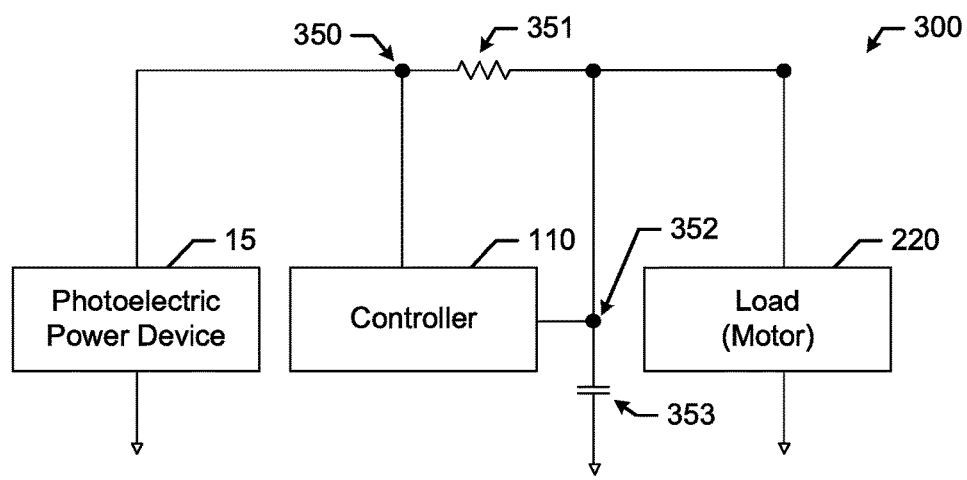

FIG. 3A shows an example schematic for an architecture 300 that can be used to measure a current into a capacitor or a voltage at a capacitor. In this regard, the architecture 300 includes the photoelectric power device 15, the controller 110, and the load 220. The output of the photoelectric power device 15 may be connected to the controller 110 at analysis node 350. Resistor 351 may be connected to analysis node 350 at a first terminal and connected to analysis node 352 at a second terminal. The controller 110 may also be connected to analysis node 352, via a second connection, and load 220 may also be connected to analysis node 352. Further, capacitor 353 may be connected to analysis node 352 at a first terminal and ground at a second terminal.

The architecture 300 permits controller 110 to analyze the signals present at analysis nodes 350 and 352. For example, controller 110 can measure the voltages at analysis nodes 350 and 352 and thereby determine the current flowing into the capacitor 353 as the characteristic value, which is proportional or indicative of the amount of light being received by the photoelectric power device 15. Further, the controller 110 may additionally or alternatively measure the voltage at analysis node 353 into the capacitor as the characteristic value, which is proportional or indicative of the amount of light being received by the photoelectric power device 15.

Figure 3B:
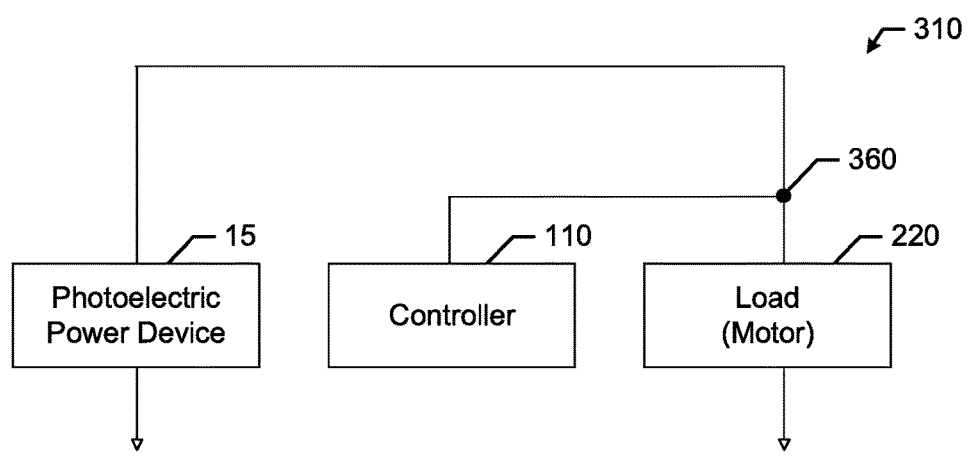

Alternatively, with respect to FIG. 3B, an example architecture 310 is provided that can be used to measure a change in charge from the photoelectric power device 15. In this regard, the architecture 310 includes the photoelectric power device 15, the controller 110, and the load 220. The output of the photoelectric power device 15 may be connected to the controller 110 at analysis node 360 which may also be connected to the load 220. This architecture 310 permits that controller 110 to analyze the signals present at analysis node 360 to measure, for example, the voltage into the load 220 to determine changes in the charge being provided by the photoelectric power device 15 as the characteristic value, which is be proportional or indicative of the amount of light being received by the photoelectric power device 15.

Figure 3C:
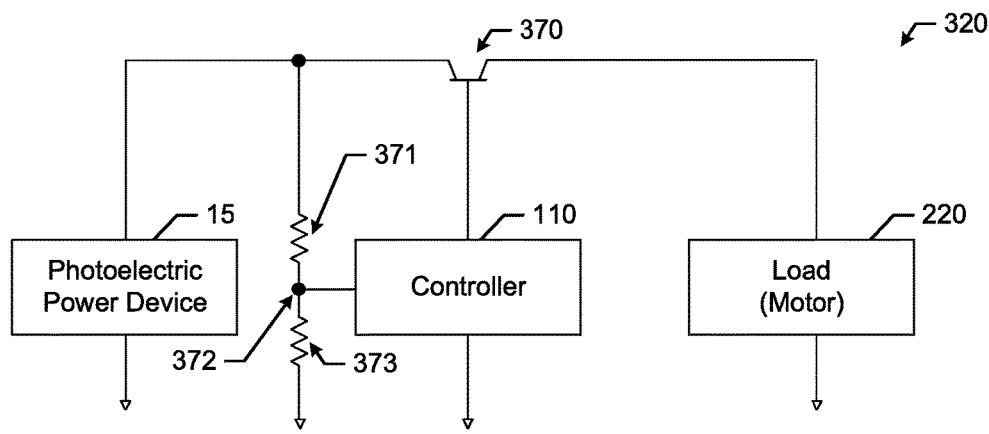

Alternatively, with respect to FIG. 3C, an example architecture 320 is provided that can be used to measure an open circuit voltage of the photoelectric power device 15. In this regard, the architecture 320 includes the photoelectric power device 15, the controller 110, and the load 220. The output of the photoelectric power device 15 may be connected to the controller 110 via a voltage divider comprising resistor 371 and resistor 373, which permits controller 110 to measure the voltage between the resistors at analysis node 372. Controller 110 may also be connected to the gate/base of a transistor 370 to control connectivity between the photoelectric power device 15 and the load 220, which may be connected to the source/emitter and the drain/collector of the transistor 370, respectively.

The architecture 320 can permit the controller 110 to analyze the signal present at analysis node 372, as the open circuit voltage. However, to measure the voltage at 372, the controller 110 may be configured to first operate the gate/base of transistor 370 to prevent or limit the current that can pass from the photoelectric power device 15 to load 220. The voltage measured at analysis node 372 is then the open circuit voltage for the photoelectric power device 15 and the characteristic value, which is proportional or indicative of the amount of light being received by the photoelectric power device 15.

Figure 3D:
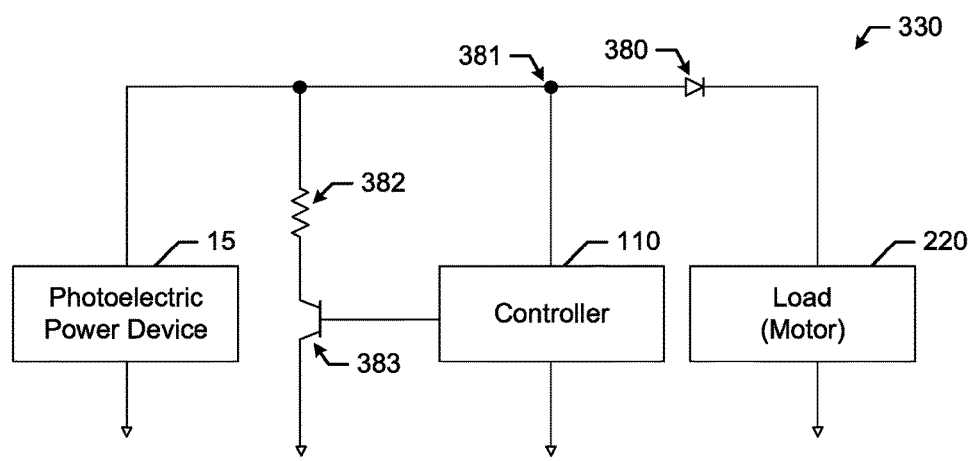

Alternatively, with respect to FIG. 3D, an example architecture 330 is provided that can be used to measure a short circuit current of the photoelectric power device 15. In this regard, the architecture 330 includes the photoelectric power device 15, the controller 110, and the load 220. The output of the photoelectric power device 15 (which is also analysis node 381) may be connected to the controller 110. Further, the controller 110 may be connected to the gate/base of transistor 383 which is connected to the output of the photoelectric power device 15 via a resistor 382 at the source/emitter and connected to ground via the drain/collector. Further, the output of the photoelectric power device 15 may be connected to the load 220 via a diode 380.

The architecture 330 can permit the controller 110 to analyze the signal present at analysis node 381 to determine the short circuit current of the photoelectric power device 15. To do so, the voltage at analysis node 381 may be measured when the gate/base of transistor 383 is activated and when the gate/base of the transistor is deactivated. The change in the voltage at the analysis node 381 can be analyzed to determine the short circuit current of the photoelectric power device 15, which can be the characteristic value and proportional or indicative of the amount of light being received by the photoelectric power device 15.

Based on the foregoing, the controller 110 may continuously monitor the characteristic value over time (e.g., while in an installation locate mode) and, for example, as an installer moves the sheet product dispenser into different locations, provide an indication if sufficient light is being received to support operation of the sheet product dispenser. The chart 400 of FIG. 4 illustrates an example installation movement process in this regard. The chart 400 shows a plot 410 of the characteristic value (obtained, for example, via one of the techniques of FIGS. 3A-3D) over time in relation to the light quantity threshold 420. As can be seen in the chart, as an installer moves the sheet product dispenser to different locations, the characteristic value changes. However, when the plot 410 crosses the light quantity threshold 420, the controller 110 is configured to operate the user interface to inform the installer that a suitable placement for the sheet product dispenser has been located.

Example System Architecture

A schematic representation of components of an example product dispenser system 100 according to various embodiments described herein is shown in FIG. 5. It should be appreciated that the illustration in FIG. 5 is for purposes of description and that the relative size and placement of the respective components may differ. Moreover, various example embodiments of the present invention described herein may be utilized with product dispensers that have different components or configurations (e.g., a single roll product dispenser). The product dispenser system 100, which includes a product dispenser 105 (e.g., a sheet product dispenser), includes components and systems that are utilized in various embodiments described herein. It is understood, that the product dispenser 105 is another example of dispenser that incorporates components that have been described previously with respect to FIGS. 1 to 4.

The product dispenser 105 may include many different components and/or systems (such as shown in FIG. 5), including, for example, the controller 110, a dispensing mechanism 125, a memory 112, a communication interface 113, a user interface 230, a power system 116, an activation sensor 120, a transfer mechanism 170, one or more product sensors 118, a tear mechanism 127, and other system(s)/sensor(s) 115. Though shown in FIG. 5 as being a component of the product dispenser 105, such components are not required to be part of the product dispenser 105 according to various embodiments herein. Along these lines, the depicted embodiment of FIG. 5 is provided for explanatory purposes and is not meant to be limiting.

As described above and otherwise herein, the controller 110 provides logic and control functionality used during operation of the product dispenser 105. Alternatively, the functionality of the controller 110 may be distributed to several controllers that each provides more limited functionality to discrete portions of the operation of product dispenser 105.

The activation sensor 120 may be configured to sense/receive user input (such as a user's hand or portion thereof) indicating a desire to cause the product dispenser 105 to dispense a portion of product (e.g., a portion of sheet from the first or second product roll). The activation sensor 120 may be any type of sensor or feature capable of receiving user input to begin dispensing, including for example, a capacitive sensor, a light sensor, an IR sensor, a mechanical lever or button, etc. The activation sensor 120 may be in communication with the controller 110 such that the controller 110 can determine when to cause dispensing of the product.

The dispensing mechanism 125 may be configured to cause dispensing of a portion of the product (e.g., sheet product, soap or other skincare product, air freshener, etc.). In some embodiments, the dispensing mechanism 125 may comprise a motor 126 that is configured to cause the dispensing of the portion of the product. For example, the dispensing mechanism 125 may comprise a motor 126 (e.g., a component of the load 220 described above) that drives one or more drive rollers (e.g., rollers 128) that are configured to pull a portion of the sheet product from the sheet product roll for dispensing. In some embodiments, a portion of the product roll may be sandwiched (e.g., in frictional contact) between the drive roller and one or more pinch rollers such that operation/rotation of the drive roller causes dispensing of a portion of the product roll. In some embodiments, the dispensing mechanism 125 may be configured to cause a dispense of a portion of soap or other skincare product. In such example embodiments, the dispensing mechanism may include a motor that drives a pump to dispense the soap or other skincare product, such as from a bag, bottle, or other container. In some embodiments, the dispensing mechanism 125 may be configured to cause a dispense of air freshener. In such example embodiments, the dispensing mechanism may include a motor that drives a fan to induce an airflow over the air freshener product to cause a portion to dispense (e.g., into the air). In some embodiments, the dispensing mechanism 125 may define one or more components that are used for initiating a dispense in a manual (or semi-manual) product dispenser, such as where a force initiated by the user may be used (e.g., instead of or in addition to a motor) to cause the dispense to occur. The dispensing mechanism 125 and/or the motor 126 may be in communication with the controller 110 such that the controller 110 may control operation of the dispensing mechanism 125 and/or motor 126.

The tear mechanism 127 may be configured to enable tearing of the dispensed portion of the product roll. In this regard, the tear mechanism 127 may comprise a tear bar or other feature that can enable a user to provide a force to tear off the portion of the product roll. For example, the tear mechanism 127 may include a serrated edge that cuts into the sheet when the user pulls the dispensed product. The separated portion of the product from the product roll may then be used and discarded as necessary by the user. Alternatively, the tear mechanism 127 may be configured to perform a tear or partial tear prior to interaction with the user such that user simply pulls on the pre-torn portion of the product roll to complete dispensing of the portion of the product.

The transfer mechanism 170 may be configured to cause transfer of the leading edge of a product roll into the dispensing mechanism 125 to enable dispensing from that product roll. The transfer mechanism 170 may be any feature or component capable of performing the transfer. In this regard, upon substantial depletion of one of the product rolls, the transfer mechanism 170 may be activated to move the leading edge of the remaining product roll into the dispensing mechanism 125 (e.g., the nip between the drive roller and pinch roller) to transfer dispensing to that remaining product roll. This avoids an empty scenario and allows continuous dispensing of product to occur between product rolls. Though the transfer mechanism 170 is shown as interacting with the first product roll 152, in some embodiments the transfer mechanism 170 may interact with the second product roll 156 (such as when the first product roll 152 is being dispensed from).

The product sensor 118 is configured to sense product data. In some embodiments, the product data may correspond to dispensing from at least one of the first product roll or the second product roll (e.g., how much product is being dispensed, when product is being dispensed, which product roll is dispensing occurring from, etc.). Additionally or alternatively, the product data may correspond to an amount of product remaining for at least one of the first product roll or the second product roll (e.g., a remaining size of the product roll, an amount of the product roll remaining, etc.). The product sensor 118 may be in communication with the controller 110 such that the controller 110 may receive the product data and perform one or more determinations regarding the product data (e.g., if one or more of the product rolls are substantially depleted, which product roll is dispensing, if there is leftover product in an exit chute, if a successful transfer occurred, the orientation of the carriage, if there is a product jam, among others). Depending on the configuration of the product dispenser 105 and/or the desired information/product data, one or more product sensors 118 may be configured to sense data from the first product roll 152, the second product roll 156, the transfer mechanism 170, the dispensing mechanism 125, the tear mechanism 127, and/or other components of the product dispenser 105 (e.g., a dispensing slot, etc.).

As mentioned above, the controller 110 is a suitable electronic device capable of executing dispenser functionality via hardware and/or software control, with the preferred embodiment accepting data and instructions, executing the instructions to process the data, and presenting the results. Controller 110 may accept instructions through the user interface 230, or through other means such as but not limited to the activation sensor 120, other sensors, voice activation means, manually-operable selection and control means, radiated wavelength and electronic or electrical transfer. Therefore, the controller 110 can be, but is not limited to, a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a solid-state computer, a single-board computer, a buffered computer, a computer network, a desktop computer, a laptop computer, a personal digital assistant (PDA) or a hybrid of any of the foregoing.

The controller 110 may be operably coupled with one or more components of the product dispenser 105. Such operable coupling may include, but is not limited to, solid-core wiring, twisted pair wiring, coaxial cable, fiber optic cable, mechanical, wireless, radio, and infrared. Controller 110 may be configured to provide one or more operating signals to these components and to receive data from these components. Such communication can occur using a well-known computer communications protocol such as Inter-Integrated Circuit (I2C), Serial Peripheral Interface (SPI), System Management Bus (SMBus), Transmission Control Protocol/Internet Protocol (TCP/IP), RS-232, ModBus, or any other communications protocol suitable for the purposes disclosed herein.

The controller 110 may include one or more processors coupled to a memory device 112. Controller 110 may optionally be connected to one or more input/output (I/O) controllers or data interface devices (not shown). The memory 112 may be any form of memory such as an EPROM (Erasable Programmable Read Only Memory) chip, a flash memory chip, a disk drive, or the like. As such, the memory 112 may store various data, protocols, instructions, computer program code, operational parameters, etc. In this regard, controller 110 may include operation control methods embodied in application code. These methods are embodied in computer instructions written to be executed by one or more processors, typically in the form of software. The software can be encoded in any language, including, but not limited to, machine language, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing.

Additionally, an operator can use an existing software application such as a spreadsheet or database and correlate various cells with the variables enumerated in the algorithms. Furthermore, the software can be independent of other software or dependent upon other software, such as in the form of integrated software.

In this regard, in some embodiments, the controller 110 may be configured to execute computer program code instructions to perform aspects of various embodiments of the present invention described herein. For example, the controller 110 may be configured to determine an instance in which one of the product rolls is substantially depleted. In such a regard, in some embodiments, the controller 110 may be configured to operate one or more components of the product dispenser 105 to enable rotation of the carriage—such as described in various example embodiments herein.

The user interface 230 may be configured to provide information and/or indications to a user. In some embodiments, the user interface 230 may comprise one or more light emitting diodes (LEDs) to indicate additional information (e.g., low battery, dispensing is occurring, low product amount, transfer complete, etc.). In some embodiments, the user interface 230 may include a screen to display such information. In some embodiments, the user interface 230 may include one or more speakers that are configured to emit an audible noise. In some embodiments, the user interface 230 may be configured to receive user input (e.g., such as input to transition the product dispenser into an installation locate mode) such as through a keypad, touchscreen, buttons, or other input device. The user interface 230 may be in communication with the controller 110 such that the controller 110 can operate the user interface 230 and/or receive instructions or information from the user interface 230. In some embodiments, the user interface 230 may be configured to operate in accordance with any type of functionality for the sheet product dispenser, such as in accordance with other functions besides those detailed herein with respect to providing user feedback for installing the sheet product dispenser. For example, the user interface 230 may provide user feedback related to the occurrence of a dispense, the amount of product remaining, among many other functions.

The communication interface 113 may be configured to enable connection to external systems (e.g., an external network 102). In this manner, the controller 110 may retrieve data and/or instructions from or transmit data and/or instructions to a remote, external server via the external network 102 in addition to or as an alternative to the memory 112.

In an example embodiment, the electrical energy for operating the product dispenser 105 may be provided by a power source 116. The power source may be comprised of, for example, the photoelectric power device 15 and the power storage device 210. As mentioned above, the power storage device 210 may be a battery, which may be comprised of one or more cells or batteries arranged in series or in parallel. For example, the battery may comprise four 1.5-volt "D" cell batteries. Additionally, the power source 116 may be supplied by an external power source, such as an alternating current ("AC") power source in addition to the photoelectric power device 15, or any other alternative power source as may be appropriate for an application. The AC power source may be any conventional power source, such as a 120V, 60 Hz wall outlets for example.

The other sensor(s)/system(s) 115 may be any other type of sensors or systems that are usable in various embodiments. Some example additional sensors or systems include a position sensor, a time sensor, a cover opening or closing sensor, among many others.

As indicated herein, some embodiments of the present invention may be utilized with other types of sheet product dispensers. For example, certain described embodiments herein may be utilized with tissue product dispensers. In such example embodiments, the tissue dispenser may have components (e.g., motor, user interface, sensors, etc.) that are powered using a photoelectric power device. Additional information regarding example tissue product dispensers, including components and functionality thereof, can be found in U.S. Pat. No. 8,162,252 and U.S. Pat. No. 7,861,964, both of which are assigned to the owner of the present invention and incorporated by reference in their entireties. Similarly, certain described embodiments herein may be utilized with napkin product dispensers. In such example embodiments, the napkin dispenser may have components (e.g., motor, user interface, sensors, etc.) that are powered using a photoelectric power device. Additional information regarding example napkin product dispensers, including components and functionality thereof, can be found in U.S. Pat. No. 9,604,811, which is assigned to the owner of the present invention and incorporated by reference in its entirety. As another example, certain described embodiments herein may be utilized with mechanical product dispensers. In such example embodiments, the mechanical product dispenser may have components (e.g., user interface, sensors, etc.) that are powered using a photoelectric power device. Additional information regarding non-automated (mechanical) product dispensers, including components and functionality thereof, can be found in U.S. Pat. No. 7,270,292 and U.S. Pat. No. 5,441,189, both of which are assigned to the owner of the present invention and incorporated by reference in their entireties.

Also as indicated herein, some embodiments of the present invention may be utilized with other types of product dispensers. For example, certain described embodiments herein may be utilized with cutlery product dispensers. In such example embodiments, the cutlery dispenser may have components (e.g., motor, user interface, sensors, etc.) that are powered using a photoelectric power device. Additional information regarding example cutlery product dispensers, including components and functionality thereof, can be found in U.S. Pat. No. 9,237,815, which is assigned to the owner of the present invention and incorporated by reference in its entirety. As another example, certain described embodiments herein may be utilized with skincare product dispensers. In such example embodiments, the skincare product dispenser may have components (e.g., pump, user interface, sensors, etc.) that are powered using a photoelectric power device. Additional information regarding example skincare product dispensers, including components and functionality thereof, can be found in U.S. Pat. No. 8,746,510 and U.S. patent application Ser. No. 15/338,902, both of which are assigned to the owner of the present invention and incorporated by reference in their entireties. As yet another example, certain described embodiments herein may be utilized with air freshener product dispensers. In such example embodiments, the air freshener dispenser may have components (e.g., motor, user interface, sensors, etc.) that are powered using a photoelectric power device. Additional information regarding example air freshener product dispensers, including components and functionality thereof, can be found in U.S. Patent Application Publication No. 2016/0030620, which is assigned to the owner of the present invention and incorporated by reference in its entirety Example Flowchart(s)

Example embodiments also include methods, apparatuses, and computer program products for controlling and operating product dispensers according to various embodiments described herein. Various examples of the operations performed in accordance with embodiments will now be provided with reference to FIG. 6.

FIG. 6 illustrates a flowchart according to an example method 600 for controlling operation of a product dispenser according to an example embodiment. The operations illustrated in and described with respect to FIG. 6 may, for example, be performed by, with the assistance of, and/or under the control of one or more of the controller 110, memory 112, user interface 230, power source 116, dispensing mechanism 125, and/or sub-components thereof or other components of the product dispenser 105.

Operation 610 may comprise receiving, at a means for receiving, such as the controller 110, an electrical input signal. In this regard, the electrical input signal may be based on the output power signal of the photoelectric power device. At operation 620, a mean for comparing, such as the controller 110, may be configured to compare a characteristic value of the electrical input signal to a light quantity threshold. Additionally, at operation 630, a means for operating, such as the controller 110, may be configured to operate, in an instance in which the characteristic value of the input signal satisfies the light quantity threshold, the user interface to indicate that sufficient light is being received by the photoelectric power device to support operation of the product dispenser.

Further, according to some example embodiments, operating the user interface may include operating the user interface to emit visual or audible user feedback. According to some example embodiments, comparing the characteristic value of the input signal may be performed in response to transitioning into an installation locate mode. Further, according to some example embodiments, the controller may be configured to repeatedly compare the characteristic value of the input signal to the light quantity threshold. According to some example embodiments, the characteristic value of the input signal may be indicative of an open circuit voltage of the photoelectric power device, a short circuit current of the photoelectric power device, a voltage measured between terminals of a power storage device, or a current through the terminals of the power storage device.

FIG. 6 illustrates a flowchart of a system, method, and computer program product according to various example embodiments described herein. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 112 and executed by, for example, the controller 110. As will be appreciated, any such computer program product may be loaded onto a computer or other programmable apparatus, such that the computer program product including the instructions which execute on the computer or other programmable apparatus creates means for implementing the functions specified in the flowcharts block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowcharts block(s).

Associated systems and methods for manufacturing example product dispensers described herein are also contemplated by some embodiments of the present invention.

CONCLUSION

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A product dispenser comprising:
a housing;
a photoelectric power device disposed on an external surface of the housing, wherein the photoelectric power device is configured to receive light and convert the received light to output a system voltage;
a power storage device configured to store energy provided via an electrical connection with the photoelectric power device, wherein the power storage device is configured to operate at the system voltage such that no voltage adjustment relative to an output of the photoelectric power device is needed; and
a dispensing mechanism comprising an electric motor that operates to cause dispensing of product from the product dispenser, wherein the electric motor is powered by the power storage device and configured to operate at the system voltage such that no voltage adjustment relative to the output of the photoelectric power device is needed;
wherein operating voltage alignment of the photoelectric power device, the power storage device, and the electric motor at the system voltage reduces electric power losses.

2. The product dispenser of claim 1, wherein the photoelectric power device comprises at least one photovoltaic cell.

3. The product dispenser of claim 1, wherein the photoelectric power device comprises a flexible surface that contours to an external surface of the housing.

4. The product dispenser of claim 1, wherein the photoelectric power device comprises solar paint.

5. The product dispenser of claim 1, wherein the photoelectric power device has a peak power transfer efficiency at the system voltage.

6. The product dispenser of claim 1, wherein the power storage device directly powers the electric motor.

7. A product dispenser comprising:
a housing;
a photoelectric power device disposed on an external surface of the housing, the photoelectric power device being configured to receive light and provide an output power signal indicative of an amount of light being received by the photoelectric device, wherein the output power signal is configured to provide power to at least an electric motor of the product dispenser for operation thereof;
a user interface; and
a controller configured to:
receive an input signal, the input signal being based on the output power signal of the photoelectric power device;
compare a characteristic value of the input signal to a light quantity threshold, wherein the light quantity threshold corresponds to an amount of light received by the photoelectric power device sufficient to support operation of the product dispenser; and
operate, in an instance in which the characteristic value of the input signal satisfies the light quantity threshold, the user interface to indicate that sufficient light is being received by the photoelectric power device to support operation of the product dispenser.

8. The product dispenser of claim 7, wherein the user interface emits visual or audible user feedback.

9. The product dispenser of claim 7, wherein the controller is configured to compare the characteristic value of the input signal in response to transitioning into an installation locate mode.

10. The product dispenser of claim 7, wherein the controller is configured to repeatedly compare the characteristic value of the input signal to the light quantity threshold.

11. The product dispenser of claim 7, wherein the characteristic value of the input signal is indicative of an open circuit voltage of the photoelectric power device.

12. The product dispenser of claim 7, wherein the characteristic value of the input signal is indicative of a short circuit current of the photoelectric power device.

13. The product dispenser of claim 7, wherein the characteristic value of the input signal is indicative of a voltage measured across terminals of a power storage device.

14. The product dispenser of claim 7, wherein the characteristic value of the input signal is indicative of a current through terminals of the power storage device.

15. A method comprising:
receiving, at a controller, an electrical input signal, wherein the electrical input signal is based on an output power signal of the photoelectric power device, wherein the output power signal is configured to provide power to at least one power consuming component of a product dispenser for operation thereof;
comparing a characteristic value of the electrical input signal to a light quantity threshold, wherein the light quantity threshold corresponds to an amount of light received by the photoelectric power device sufficient to support operation of the product dispenser; and
operating, by the controller, in an instance in which the characteristic value of the input signal satisfies the light quantity threshold, a user interface to indicate that sufficient light is being received by the photoelectric power device to support operation of the product dispenser.

16. The method of claim 15, further comprising repeatedly comparing, by the controller, the characteristic value of the input signal to the light quantity threshold.

17. The method of claim 15, wherein the characteristic value of the input signal is indicative of an open circuit voltage of the photoelectric power device.

18. The method of claim 15, wherein the characteristic value of the input signal is indicative of a short circuit current of the photoelectric power device.

19. The method of claim 15, wherein the characteristic value of the input signal is indicative of a voltage measured across terminals of a power storage device.

20. The method of claim 15, wherein the characteristic value of the input signal is indicative of a current through terminals of the power storage device.

\* \* \* \* \*